US007525792B2

(12) United States Patent
Yokote

(10) Patent No.: US 7,525,792 B2
(45) Date of Patent: Apr. 28, 2009

(54) ELECTRONIC APPARATUS PROVIDED WITH HOUSING HAVING LIQUID PROOF STRUCTURE

(75) Inventor: Satoshi Yokote, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 11/391,013

(22) Filed: Mar. 28, 2006

(65) Prior Publication Data

US 2007/0025069 A1    Feb. 1, 2007

(30) Foreign Application Priority Data

Jul. 29, 2005    (JP)    ............................. 2005-220360

(51) Int. Cl.
H05K 7/00 (2006.01)
H05K 5/00 (2006.01)
G06F 1/16 (2006.01)

(52) U.S. Cl. .................... 361/680; 361/683; 200/302.1; 400/472

(58) Field of Classification Search ................ 361/680, 361/683
See application file for complete search history.

(56) References Cited

U.S. PATENT DOCUMENTS

| 3,657,492 | A | * | 4/1972 | Arndt et al. ................. 200/5 R |
| 3,890,480 | A | * | 6/1975 | Berling et al. ........... 200/302.2 |
| 4,791,258 | A | * | 12/1988 | Youtz et al. .............. 200/302.1 |
| 5,237,486 | A | * | 8/1993 | LaPointe et al. ............ 361/681 |
| 5,455,746 | A | * | 10/1995 | Sato et al. .................... 361/816 |
| 5,697,718 | A | * | 12/1997 | Erler et al. .................. 400/714 |
| 5,748,444 | A | * | 5/1998 | Honda et al. ................ 361/687 |
| 5,810,491 | A | * | 9/1998 | Muller et al. ............... 400/496 |
| 6,273,623 | B1 | * | 8/2001 | Chao .......................... 400/472 |
| 6,606,254 | B2 | * | 8/2003 | Yoneda ....................... 361/799 |
| 6,610,944 | B2 | * | 8/2003 | Lee et al. ................. 200/302.1 |
| 6,826,040 | B2 | * | 11/2004 | Wang .......................... 361/681 |

FOREIGN PATENT DOCUMENTS

| JP | 2002-023890 | 1/2002 |
| JP | 2002-182790 | 6/2002 |
| JP | 2003-122454 | 4/2003 |

* cited by examiner

Primary Examiner—Anatoly Vortman
Assistant Examiner—Quinn Hunter
(74) Attorney, Agent, or Firm—Blakely, Sokoloff, Taylor & Zafman LLP

(57) ABSTRACT

According to one embodiment, an electronic apparatus includes a housing, a unit supported on the housing, and a mounting section which is provided on the housing and on which the unit is placed. The mounting section includes an opening, a support wall which surrounds the opening and supports the unit, a cut portion which is provided in the support wall, and a lid which is fitted in the cut portion and is a part of the support wall.

16 Claims, 10 Drawing Sheets

ELECTRONIC APPARATUS PROVIDED WITH HOUSING HAVING LIQUID PROOF STRUCTURE

CROSS-REFERENCE TO RELATED APPLICATIONS

This application is based upon and claims the benefit of priority from Japanese Patent Application No. 2005-220360, filed Jul. 29, 2005, the entire contents of which are incorporated herein by reference.

BACKGROUND

1. Field

One embodiment of the invention relates to an electronic apparatus provided with a housing having an opening, for example, having a liquid-proof structure around the opening.

2. Description of the Related Art

An electronic apparatus, such as a portable computer, is provided with a housing. A circuit board is contained in the housing. An electronic component, such as a connector, is mounted on the circuit board. Further, the housing has a keyboard setting section. The keyboard setting section has an opening that opens so that the circuit board is exposed through it. A keyboard is mounted on the keyboard setting section so as to cover the opening.

If a liquid, such as coffee or water, is accidentally spilled on the keyboard while the keyboard is being operated, it may enter the housing through the opening. If the liquid wet the circuit board in the housing, in particular, wiring may be short-circuited to cause damage to electronic components that are mounted on the circuit board. Thereupon, a novel computer has been proposed which is provided with a waterproof structure. One such computer is described in Jpn. Pat. Appln. KOKAI Publication No. 2003-122454, for example.

The computer described in Jpn. Pat. Appln. KOKAI Publication No. 2003-122454 has a first exit hole that is formed in a keyboard substrate. The first exit hole is above a guide channel that has a second exit hole. The second exit hole is above a third exit hole that opens to the outside of the computer.

In order to enhance the waterproofness of a portable computer, for example, a region around the opening may possibly be made watertight by bringing the keyboard into close contact with a support wall that is formed on the keyboard setting section so as to surround the opening and supports the keyboard.

However, the portable computer includes a display unit that contains a display device, such as a liquid crystal display panel. The display device is connected electrically to the circuit board in the housing by, for example, a cable.

If the cable is guided into the housing through the opening of the keyboard setting section, it never fails to be interposed between the keyboard and the support wall.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus includes a housing, a unit, and a mounting section which is provided on the housing. The mounting section includes an opening, a support wall, a cut portion, and a lid. The support wall surrounds the opening and supports the unit. The cut portion is provided in the support wall. The lid is fitted in the cut portion and is a part of the support wall.

Embodiments of the present invention that are applied to a portable computer will now be described with reference to the accompanying drawings.

Figure 1:
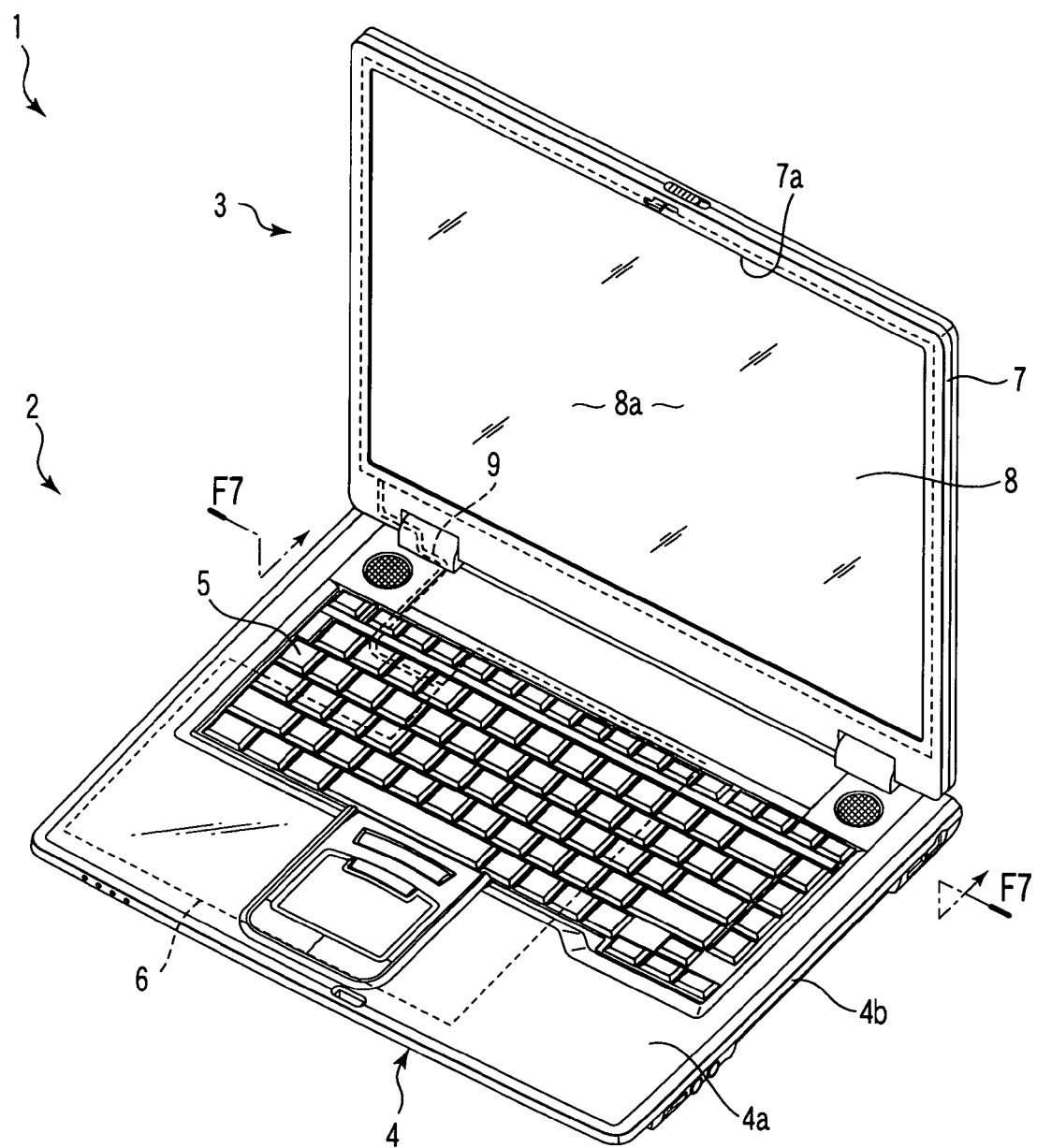
FIG. 1 is an exemplary perspective view of a portable computer according to a first embodiment of the invention.

FIGS. 1 to 8 show a portable computer 1 as an electronic apparatus according to a first embodiment of the present invention. As shown in FIG. 1, the computer 1 comprises a body 2 and a display unit 3.

The body 2 is provided with a box-shaped housing 4. The housing 4 has a top wall 4a, a peripheral wall 4b, and a bottom wall (not shown). The top wall 4a of the housing 4 supports a keyboard 5. The keyboard 5 is an example of a functional unit. The housing 4 contains a circuit board 6 therein.

The display unit 3 has a display housing 7 and a liquid crystal display panel 8 therein. The panel 8 has a display screen 8a. The screen 8a is exposed to the outside of the display housing 7 through an opening 7a in the front face of the housing 7. The display panel 8 is connected electrically to the circuit board 6 which is accommodated in the housing 4 by a cable 9.

The display unit 3 is supported on the rear end part of the housing 4 by a hinge unit (not shown). Thus, the display unit 3 is rockable between a closed position in which it covers the top wall 4a from above and an open position in which it is raised to expose the top wall 4a and the display screen 8a.

Figure 2:
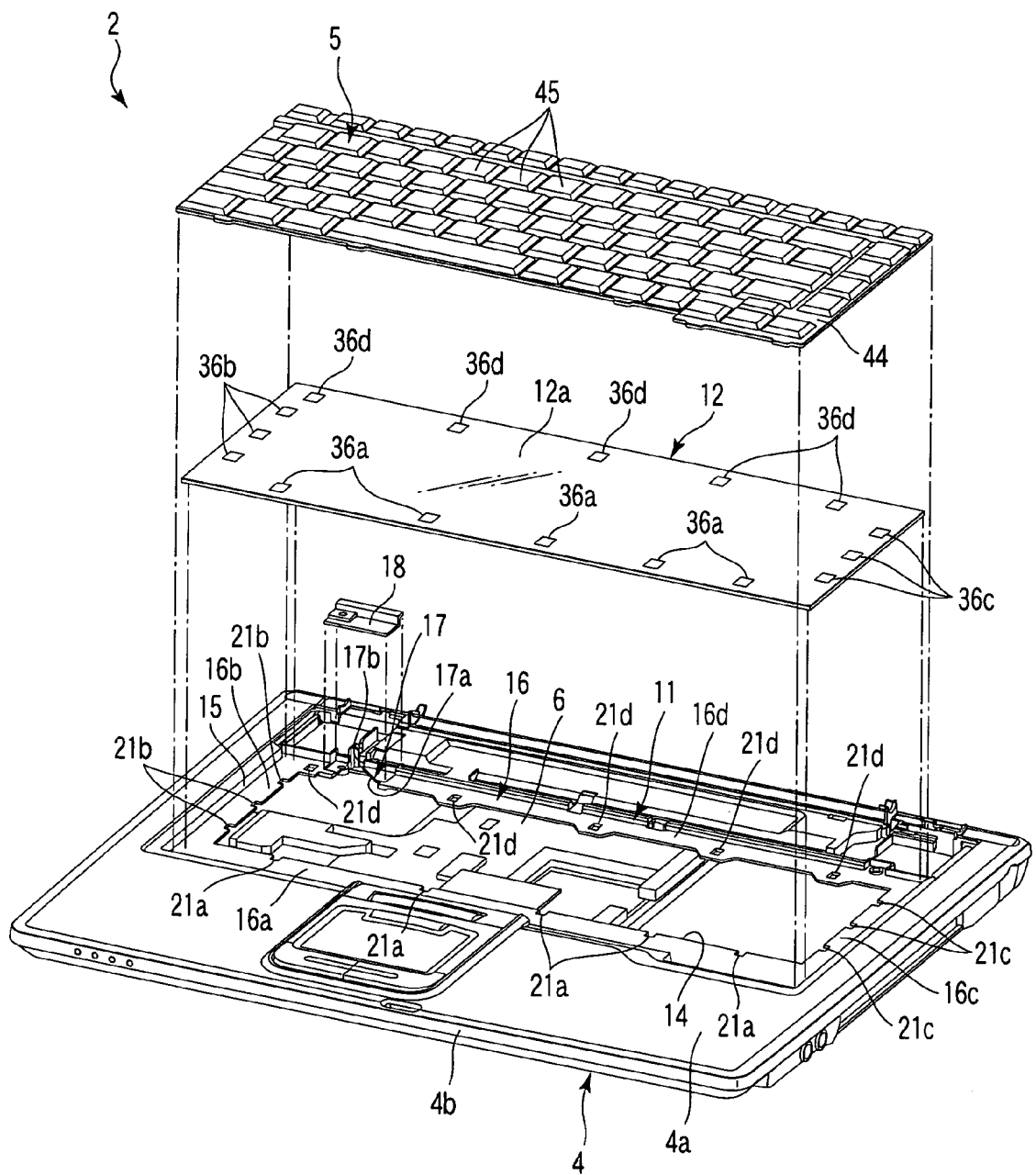
FIG. 2 is an exemplary exploded perspective view of a body according to the first embodiment.

As shown in FIG. 2, the body 2 has a keyboard setting section 11 on the top wall 4a and a plate 12 which is mounted on the setting section 11.

The keyboard setting section 11 is an example of a mounting section. It has an external shape a little larger than that of the keyboard 5 and is hollowed corresponding to the thickness of the keyboard 5. The keyboard 5 is removably placed on the keyboard setting section 11. The setting section 11 has an opening 14, peripheral wall 15, first bottom wall 16, cut portion 17, and lid 18. The first bottom wall 16 is an example of a support wall.

The opening 14 is formed substantially covering the whole area of the keyboard setting section 11. It opens to the interior of the housing 4, exposing the circuit board 6. The attaching of the cable 9 to an electronic component (not shown), such as a connector, mounted on the circuit board 6 can be performed through the opening 14.

At the peripheral portion of the keyboard setting section 11, as shown in FIG. 2, the peripheral wall 15 extend downward from the top wall 4a that is situated off the setting section 11. The first bottom wall 16 projects horizontally from the lower end of the peripheral wall 15 toward the center of the opening 14. In other words, the peripheral wall 15 rise from the peripheral end part of the first bottom wall 16 which is situated off the opening 14.

The first bottom wall 16 has an upper surface 16u. The upper surface 16u is an example of a first surface that faces the keyboard 5. The first bottom wall 16 supports the keyboard 5 from below when the keyboard 5 is mounted on the keyboard setting section 11.

The first bottom wall 16 surrounds the entire peripheral edge of the opening 14. More specifically, it has a first wall portion 16a situated in front of the opening 14, a second wall portion 16b on the left of the opening 14, a third wall portion 16c on the right of the opening 14, and a fourth wall portion 16d behind the opening 14.

As shown in FIG. 2, the first bottom wall 16 has first, second, third, and fourth engaging portions 21a, 21b, 21c and 21d. The first engaging portions 21a are formed in the first wall portion 16a. They are arranged side by side in the longitudinal direction of the housing 4. Each first engaging portion 21a has a rectangular cut that is cut in the rear end portion of the first wall portion 16a.

The second engaging portions 21b are formed in the second wall portion 16b. They are arranged side by side in the transverse direction of the housing 4. Each second engaging portion 21b has a rectangular cut that is cut in the right-hand end portion of the second wall portion 16b. The third engaging portions 21c are formed in the third wall portion 16c. They are arranged side by side in the transverse direction of the housing 4. Each third engaging portion 21c has a rectangular cut that is cut in the left-hand end portion of the third wall portion 16c.

The fourth engaging portions 21d are formed in the fourth wall portion 16d. They are arranged side by side in the longitudinal direction of the housing 4. Each fourth engaging portion 21d has a rectangular hole that opens in the fourth wall portion 16d.

Figure 3:
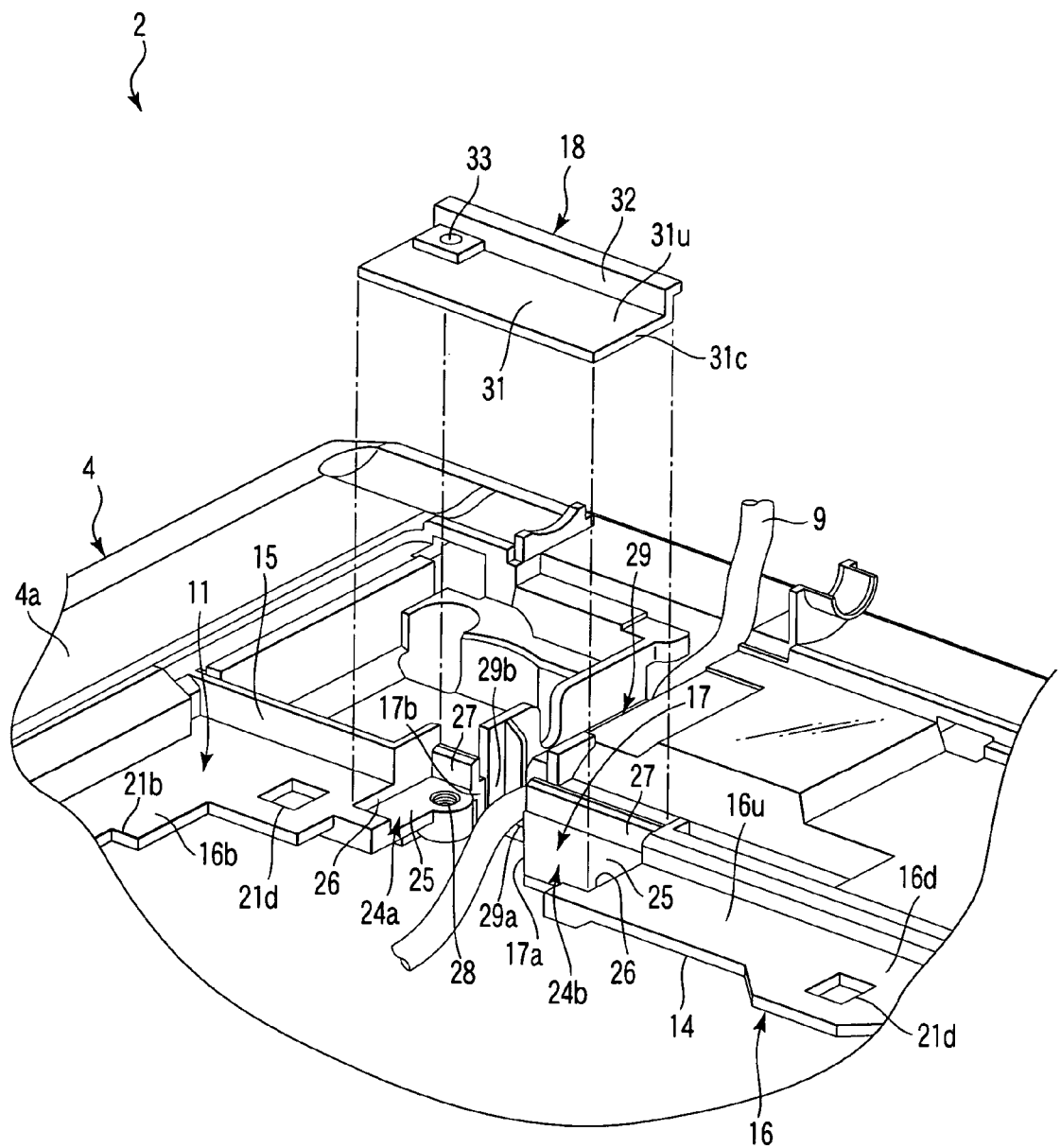
FIG. 3 is an exemplary perspective view showing a cut portion and its surroundings according to the first embodiment.

As shown in FIG. 2, the cut portion is made in a part of the bottom wall 16 and the peripheral wall 15. The cut portion 17 is formed by partially cutting the first bottom wall 16 and the peripheral wall 15 at a region in the left rear of the keyboard setting section 11. As shown in FIG. 3, the cut portion 17 has a first groove 17a, second groove 17b, first step portion 24a, and second step portion 24b.

Each of the first and second step portions 24a and 24b is an example of lid supporting portion. The first step portion 24a is situated at the left-hand end part of the cut portion 17. The second step portion 24b is situated at the right-hand end part of the cut portion 17. Each of the step portions 24a and 24b has a second bottom wall 25, side wall 26, and rear wall 27. The first step portion 24a has a tapped hole 28.

The second bottom wall 25 is situated in a position one step lower than the first bottom wall 16. The side wall 26 of the first step portion 24a rises from the left-hand end of the second bottom wall 25. The side wall 26 of the second step portion 24b rises from the right-hand end of the second bottom wall 25. Each side wall 26 connects its corresponding second bottom wall 25 to the first bottom wall 16. Each rear wall 27 rises from the rear end of its corresponding second bottom wall 25. The tapped hole 28 is provided in the second bottom wall 25 of the first step portion 24a. The hole 28 opens upward.

The first groove 17a is situated between the first and second step portions 24a and 24b and separates the respective second bottom walls 25 of the step portions 24a and 24b.

The second groove 17b is located behind the first groove 17a. It is situated between the first and second step portions 24a and 24b and separates the respective rear walls 27 of the step portions 24a and 24b. The second groove 17b communicates with the first groove 17a.

Figure 8:
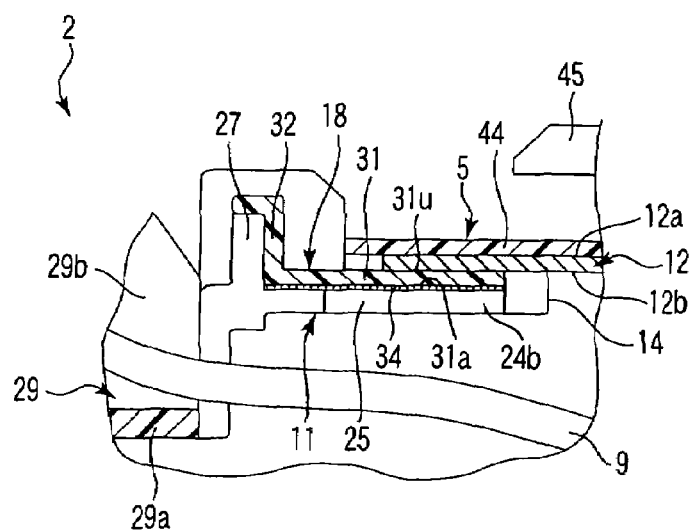
FIG. 8 is an exemplary sectional view of the cut portion and its surroundings taken along line F8-F8 of FIG. 7.

As shown in FIGS. 3 and 8, a cable mounting groove 29 is provided behind the second groove 17b. The groove 29 is formed by a groove bottom 29a and left- and right-hand side walls 29b that rise from the bottom 29a. As shown in FIG. 8, the groove bottom 29a is situated below the first bottom wall 16 of the keyboard setting section 11.

Under the keyboard setting section 11, the cable mounting groove 29 communicates with the interior of the housing 4. More specifically, the grove 29 communicates with the opening 14 through the first and second grooves 17a and 17b of the cut portion 17. The cable 9 extends along the cable mounting groove 29 from the liquid crystal display panel 8. It further extends into the housing 4 through the opening 14. The cut portion 17 is located in a position corresponding to the groove 29, that is, in a wiring position for the cable 9.

As shown in FIG. 3, the lid 18 is removably fitted in the cut portion 17. It is attached to and supported by the first and second step portions 24a and 24b. The lid 18 has a third bottom wall 31, rising portion 32, and hole 33.

The third bottom wall 31 has a width equal to that of the cut portion 17, that is, the distance between the left-hand end of the first step portion 24a and the right-hand end of the second step portion 24b. Thus, the third bottom wall 31 of the lid 18 covers the first groove 17a and is fitted between the respective side walls 26 of the first and second step portions 24a and 24b. The bottom wall 31 has an upper surface 31u, lower surface 31a, left-hand side surface 31b, and right-hand side surface 31c. The upper surface 31u is an example of a second surface that faces the keyboard 5.

Figure 4:
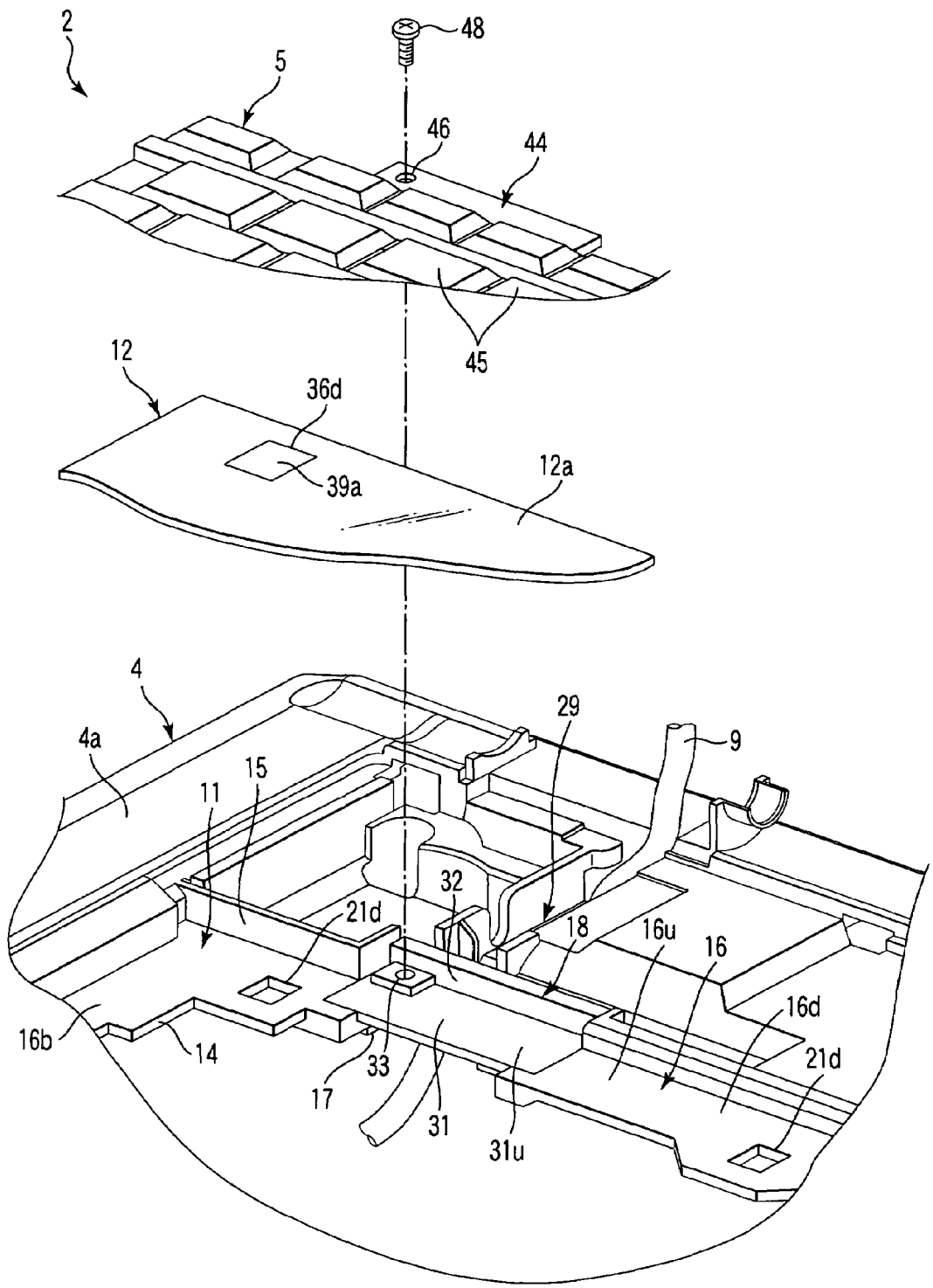
FIG. 4 is an exemplary perspective view showing the cut portion having a lid mounted thereon according to the first embodiment.

The thickness of the third bottom wall 31 is equal to the side wall 26 of the first or second step portion 24a or 24b. Thus, when the lid 18 is attached to the first and second step portions 24a and 24b, as shown in FIG. 4, the upper surface 31u of the third bottom wall 31 is flush with the upper surface 16u of the first bottom wall 16.

The rising portion 32 of the lid 18 rises from the rear end of the third bottom wall 31 and is substantially as high as the peripheral wall 15. The rising portion 32 has a width equal to that of the cut portion 17. Thus, the rising portion 32 of the lid 18 covers the second groove 17b and is fitted between the peripheral walls 15 on the left- and right-hand edges of the cut portion 17.

As shown in FIG. 3, the hole 33 is located in a position corresponding to the tapped hole 28 of the first step portion 24a.

Figure 7:
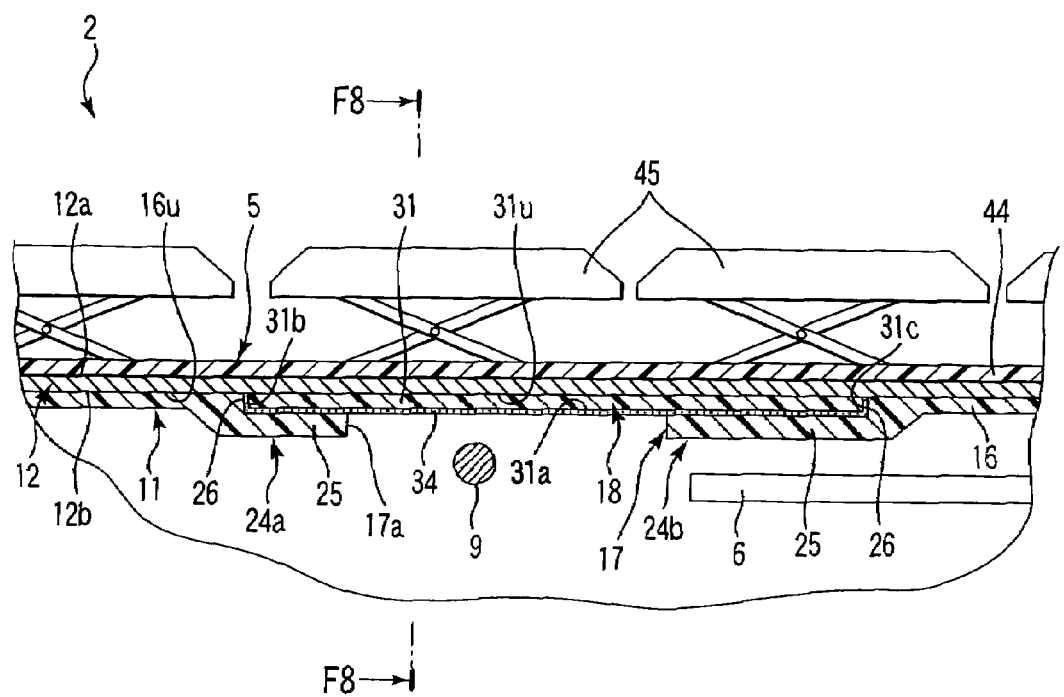
FIG. 7 is an exemplary sectional view of the portable computer taken along line F7-F7 of FIG. 1.

As shown in FIG. 7, the lower surface 31a and the left- and right-hand side surfaces 31b and 31c of the third bottom wall 31 have an adhesive layer 34. A double-sided adhesive tape is one example of the adhesive layer 34. The lid 18 is fixed to the first and second step portions 24a and 24b by the adhesive layer 34.

As shown in FIG. 2, the plate 12 has an external shape larger than that of the opening 14 of the keyboard setting section 11. One example of the plate 12 may be suitably formed of a lightweight, rigid material, e.g., a magnesium alloy. The plate 12 has first, second, third, and fourth retaining portions 36a, 36b, 36c and 36d. The first retaining portions 36a are provided in positions corresponding individually to the first engaging portions 21a of the keyboard setting section 11.

Figure 5:
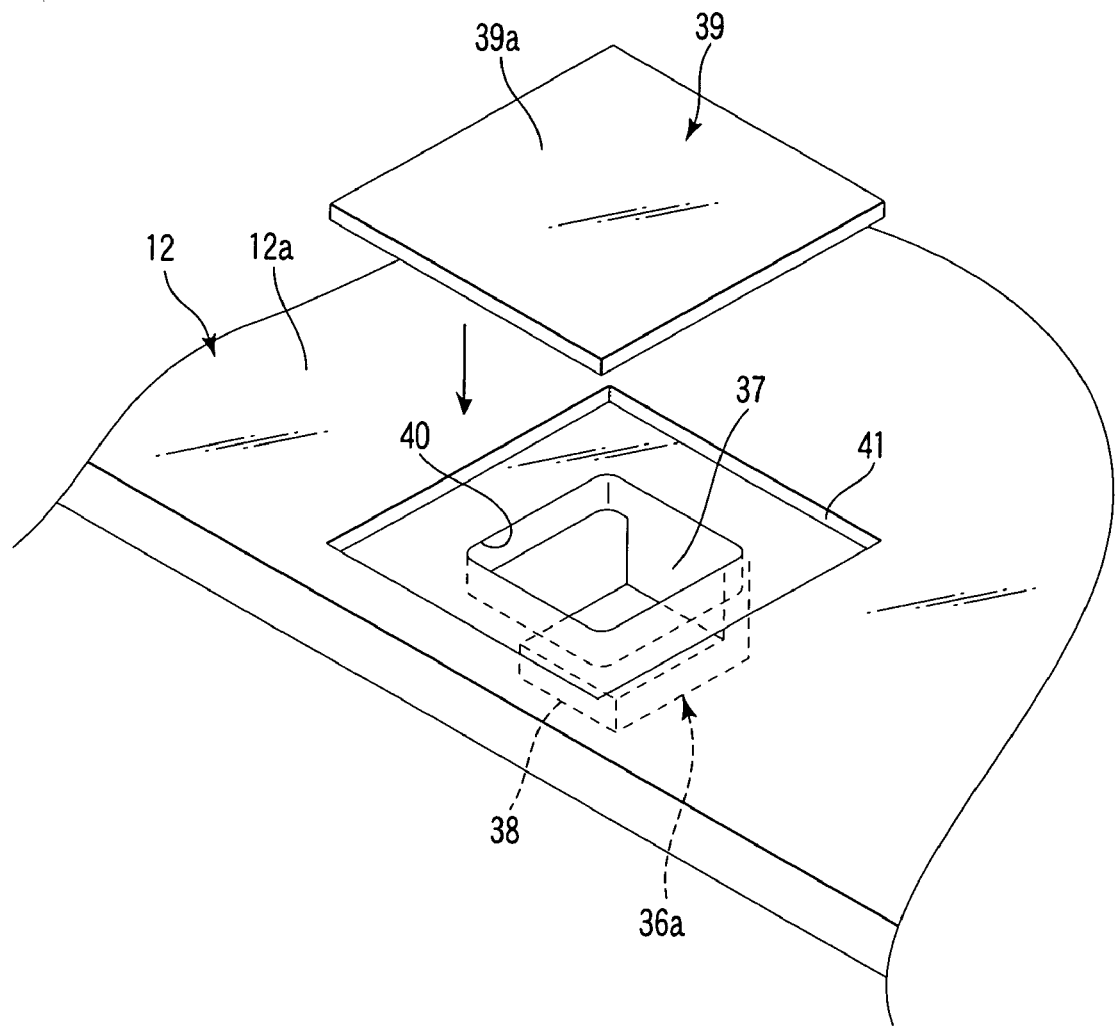
FIG. 5 is an exemplary perspective view of a first retaining portion according to the first embodiment.

As shown in FIG. 5, each first retaining portion 36a has a first member 37, second member 38, and insulator 39. The first member 37 projects downward from a lower surface 12b of the plate 12. The second member 38 extends parallel to the lower surface 12b of the plate 12 and projects from the front end of the first member 37 toward the front of the housing 4. Thus, each first retaining portion 36a is an L-shaped hook.

For ease of manufacture, each first retaining portion 36a has a hole 40 that penetratingly extends from the upper surface 12a of the plate 12 to the lower surface 12b. The insulator 39 is mounted on the upper surface 12a in such a way as to close the hole 40. The plate 12 has a hollow 41 in a region to which the insulator 39 is attached lest an upper surface 39a of the insulator 39 project from the upper surface 12a of the plate 12. One example of the material of the insulator 39 is impermeable to liquids and may be a resin film or sheet coated with an adhesive material, for example.

Figure 6:
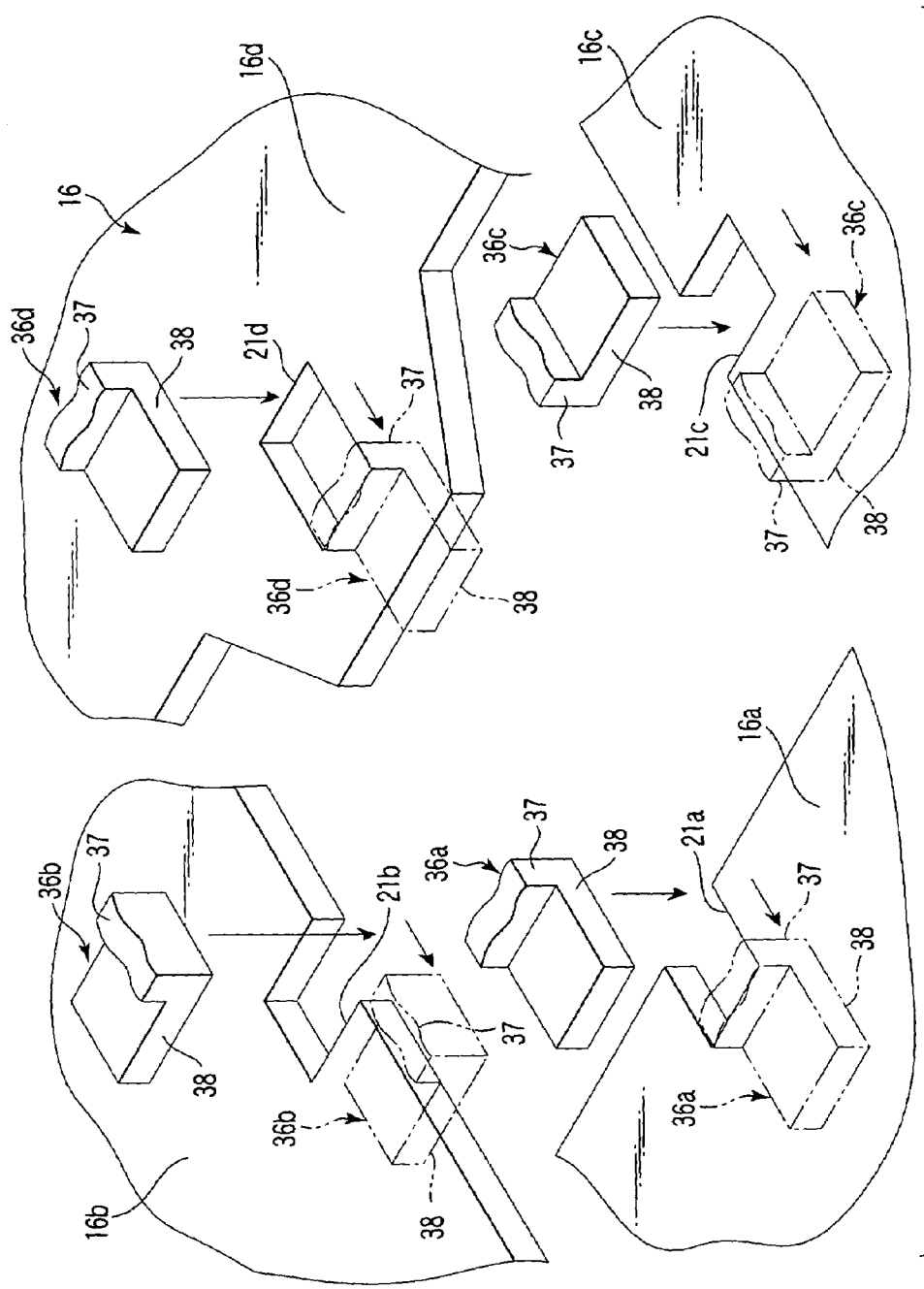
FIG. 6 is an exemplary perspective view showing how a plate is mounted on a keyboard setting section according to the first embodiment.

While the first retaining portions 36a have been described above, each of the second, third, and fourth retaining portions 36b, 36c and 36b also has its own first member 37, second member 38, and insulator 39. As shown in FIG. 6, each second retaining portion 36b is situated in a position corresponding to each second engaging portion 21b of the keyboard setting section 11. The second member 38 of the second retaining portion 36b extends parallel to the lower surface 12b of the plate 12 and projects toward the left-hand side of the housing 4.

Each third retaining portion 36c is provided in a position corresponding to each third engaging portion 21c. The second member 38 of the third retaining portion 36c extends parallel to the lower surface 12b of the plate 12 and projects toward the right-hand side of the housing 4. Each fourth retaining portion 36d is provided in a position corresponding to each fourth engaging portion 21d. The second member 38 of the fourth retaining portion 36d extends parallel to the lower surface 12b of the plate 12 and projects toward the front of the housing 4.

As shown in FIG. 2, the plate 12 is placed on the keyboard setting section 11 in such a way as to cover the opening 14. Thus, the first, second, third, and fourth retaining portions 36a, 36b, 36c and 36d of the plate 12 are caused to engage the first, second, third, and fourth engaging portions 21a, 21b, 21c and 21d, respectively, of the keyboard setting section 11.

More specifically, as shown in FIG. 6, the respective second members 38 of the first to fourth retaining portions 36a to 36d are inserted individually into the cuts or holes of the first to fourth engaging portions 21a to 21d. After the second members 38 are inserted into the cuts or holes, the plate 12 is slid toward the front of the housing 4. When the plate 12 is slid, the respective second members 38 of the first to fourth retaining portions 36a to 36d are caught by the lower surface of the first bottom wall 16, whereupon the plate 12 can be securely fixed to the housing 4 in its vertical direction.

With the plate 12 slid in this manner, the plate 12 is fixed to the keyboard setting section 11 through engagement between screw 48 and holes 28, 33. Thereupon, the plate 12 can be fixed to the housing 4 also in its horizontal direction.

As shown in FIG. 2, the keyboard 5 is placed on the plate 12 after the plate 12 is mounted on the keyboard setting section 11. Thus, the plate 12 is interposed between the keyboard 5 and the first bottom wall 16.

The keyboard 5 has a keyboard substrate 44, keys 45, and hole 46. The keyboard substrate 44 is in contact with the plate 12. The keys 45 are arranged side by side on the keyboard substrate 44. As shown in FIG. 4, the hole 46 is provided in a position corresponding to the hole 33 of the lid 18.

The following is a description of the mechanism of the portable computer 1.

In assembling the portable computer 1, the housing 4 of the body 2 is first assembled having the circuit board 6 therein. Before the lid 18, plate 12, and keyboard 5 are attached to the assembled housing 4, the circuit board 6 is exposed to the outside of the housing 4 through the opening 14 of the keyboard setting section 11. With the circuit board 6 exposed in this manner, the display unit 3 that is assembled separately is mounted on the body 2. In mounting the display unit 3 on the body 2, the cable 9 that extends from the liquid crystal display panel 8 of the display unit 3 is connected to the circuit board 6 in the housing 4.

As shown in FIG. 1, the cable 9 extends from the display unit 3 that is provided outside the housing 4. As shown in FIGS. 3 and 8, the cable 9 is attached to the cable mounting groove 29 crossing the first and second grooves 17a and 17b from top to bottom. The leading end of the cable 9 is inserted into the opening 14 and guided into the housing 4. The leading end of the cable 9 in the housing 4 is connected to a connector (not shown) that is mounted on the circuit board 6. Thus, the cable 9 is connected electrically to the circuit board 6.

After the cable 9 is connected electrically to the circuit board 6, as shown in FIG. 3, the lid 18 is fitted into the cut portion 17. More specifically, the lid 18 is bonded to the first and second step portions 24a and 24b with its third bottom wall 31 aligned with the second bottom walls 25 of the step portions 24a and 24b. Thereupon, the third bottom wall 31 and the rising portion 32 of the lid 18 cover the first and second grooves 17a and 17b, respectively. The first bottom wall 16 and third bottom wall 31 of the lid 18 surround the whole circumference of the opening 14. Clearances between the lid 18 and the first and second step portions 24a and 24b are sealed by the adhesive layer 34.

After the lid 18 is attached to the first and second step portions 24a and 24b, as shown in FIGS. 2 and 4, the plate 12 is fixed to the keyboard setting section 11 by being slid toward the front of the housing 4. When the plate 12 is mounted on the setting section 11, it covers the opening 14. As the first to fourth retaining portions 36a to 36d engage the first to fourth engaging portions 21a to 21d, respectively, moreover, the lower surface 12b of the plate 12 is brought into close contact with the first bottom wall 16 and third bottom wall and 31 of the lid 18 with uniformity.

After the plate 12 is mounted on the keyboard setting section 11, the keyboard 5 is placed on the plate 12. With the keyboard 5 placed on the plate 12, as shown in FIG. 4, a screw 48 is screwed into the tapped hole 28 of the first step portion 24a through the hole 33 and the hole 46 of the keyboard 5, whereupon the keyboard 5 is fixed to the keyboard setting section 11. Thus, the portable computer 1 is assembled.

If a liquid, such as coffee or water, is accidentally spilled on the keyboard 5 while the portable computer 1 is being used, it enters the keyboard setting section 11. The opening 14 of the setting section 11 is covered by the plate 12. Further, the lower surface 12*b* of the plate 12 is in close contact with the first bottom wall 16 and third bottom wall 31 of the lid 18. Therefore, the liquid can be prevented from entering the housing 4 through the setting section 11.

The keyboard setting section 11 has peripheral wall 15. Further, the second groove 17*b* of the setting section 11 is covered by the rising portion 32 of the lid 18. Therefore, the liquid spilled on the keyboard 5 can be prevented from flowing out to other regions through the setting section 11.

According to the portable computer 1 constructed in this manner, its assemblability can be secured, and the liquid-proof performance of the body 2 can be enhanced. Thus, if the first bottom wall 16 is formed surrounding the whole circumference of the opening 14, the cable 9 is guided into the housing 4 through a hole that is located off the keyboard setting section 11. However, it is very troublesome to pass the cable 9 through this hole. Although the liquid-proof performance of the body 2 can be secured, for example, the assemblability of the portable computer is low.

According to the portable computer 1 of the present embodiment, on the other hand, the operation for attaching the cable 9 of the display unit 3 to the circuit board 6 in the housing 4 can be performed efficiently. More specifically, the cable 9 is guided into the housing 4 through the opening 14. Since the opening 14 opens wide to cover substantially the whole area of the keyboard setting section 11 so that the interior of the housing 4 is exposed, the cable 9 can be attached very efficiently through the opening 14.

Since the cable 9 is arranged along the first and second grooves 17*a* and 17*b* of the cut portion 17, it can be prevented from overlapping the first bottom wall 16 even if it is fitted into the housing 4 through the opening 14. When the plate 12 is mounted on the first bottom wall 16, therefore, the lower surface 12*b* of the plate 12 can be brought into close contact with the first bottom wall 16.

Further, the portable computer 1 of the present embodiment has lid 18, and the whole circumference of the opening 14 can be surrounded by the first bottom wall 16 and third bottom wall 31 of the lid 18. If the plate 12 is placed on the first and third bottom walls 16 and 31, therefore, a region around the opening 14 can be sealed in a liquid-tight manner. Thus, a liquid can be prevented from getting into the housing 4 through the opening 14. A "liquid-proof structure" includes a waterproof structure and implies a structure that can prevent penetration of water or any other liquid.

Since the upper surface 16*u* of the first bottom wall 16 and the upper surface 31*u* of the third bottom wall 31 are situated flush with each other, in particular, the lower surface 12*b* of the plate 12 can be brought into close contact with the first and third bottom walls 16 and 31.

The liquid-proof performance of the body 2 can be also secured if the bottom surface of the keyboard substrate 44 is formed smoothly so that the keyboard 5 brought directly into close contact with the first and third bottom walls 16 and 31 to cover the opening 14. However, the plate 12 is mounted separately so that the retaining portions 36*a* to 36*d* enable the plate 12 to be brought uniformly and entirely into close contact with the bottom walls 16 and 31. Thus, the liquid-proof performance of the body 2 is improved.

Since the lid 18 is attached to the first and second step portions 24*a* and 24*b* with the adhesive layer 34, no clearance exists between the lid 18 and the step portions 24*a* and 24*b*. Thus, a liquid can be prevented from entering the housing 4.

Further, the use of the adhesive layer 34 facilitates the lid 18 to be attached to the step portions 24*a* and 24*b*.

Since the lid 18 covers the second groove 17*b*, moreover, a liquid spilled on the keyboard 5 can be prevented from flowing out to other regions through the keyboard setting section 11. Thus, the portable computer 1 can be obtained having further enhanced liquid-proof performance.

Since the respective holes 28, 33 and 46 of the first step portion 24*a*, lid 18, and keyboard 5 are provided on the same axis, the keyboard 5, lid 18, and first bottom wall 16 can be fixed together with use of the one screw 48.

The location of the adhesive layer 34 is not limited to the lower surface 31*a* of the third bottom wall 31 but the layer 34 may be provided on the respective second bottom walls 25, side walls 26, and rear walls 27 of the first and second step portions 24*a* and 24*b*, for example. Further, the mechanisms for the attachment of the lid 18 to the step portions 24*a* and 24*b* is not limited to the adhesive layer 34. For example, another sealing member may alternatively be attached between the lid 18 and the step portions 24*a* and 24*b*. In this case, the lid and the step portions may be fixed by latch structures or hook-and-anchor assemblies, for example.

Next, a portable computer 1*a* as an electronic apparatus according to a second embodiment of the present invention will now be described with reference to FIGS. 9 to 12. In the personal computer 1*a*, the same structural members as in the personal computer 1 according to the first embodiment are denoted by the same reference numerals, respectively, and their explanation will be omitted.

Figure 9:
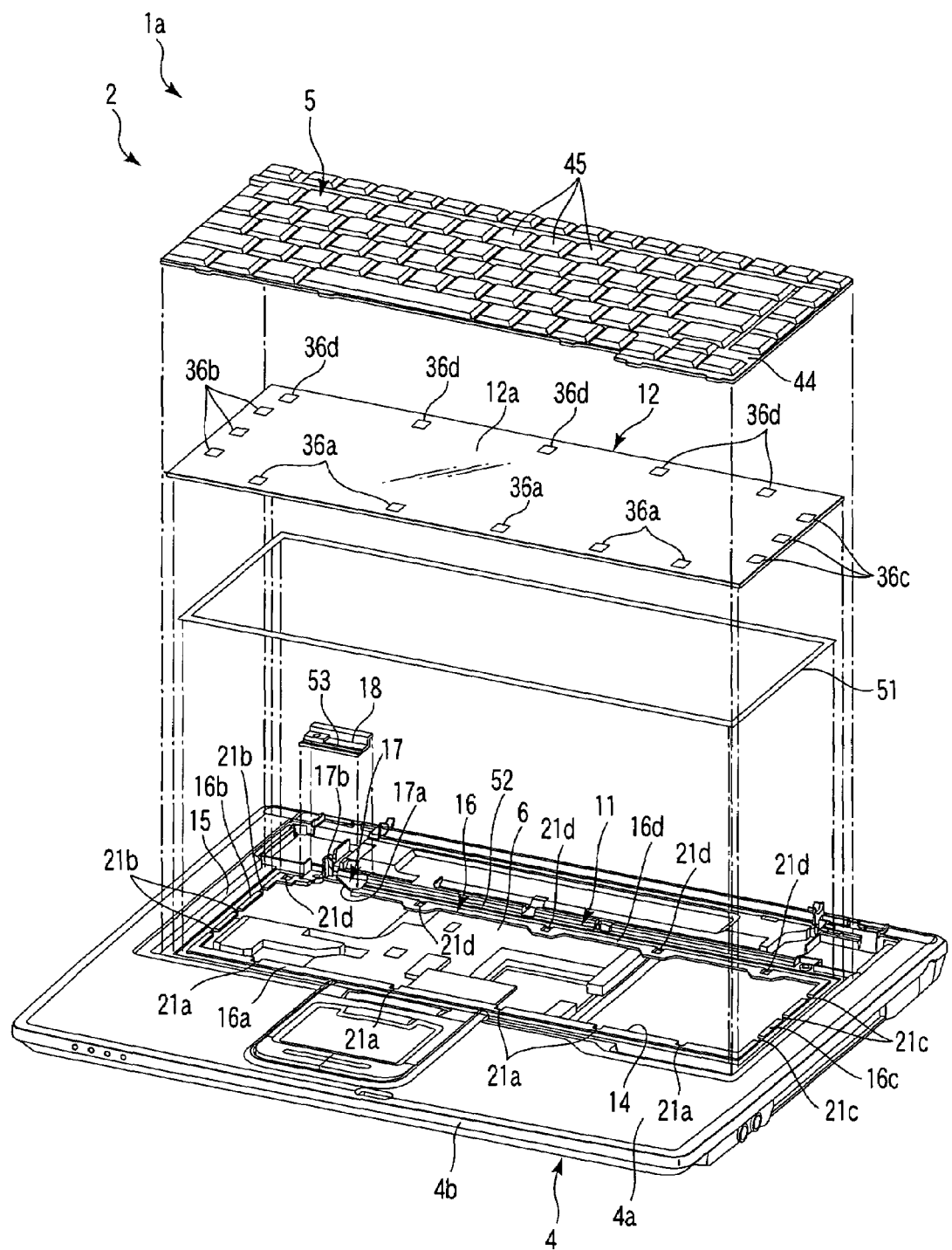
FIG. 9 is an exemplary exploded perspective view of a body of a portable computer according to a second embodiment of the invention.

As shown in FIG. 9, a body 2 of the portable computer 1*a* has a sealing member 51. The sealing member 51 is interposed between a first bottom wall 16 of a keyboard setting section 11 and a plate 12. It is in the form of a frame that is one size larger than the opening 14 of the setting section 11 and surrounds the opening 14. One example of material of the sealing member 51 is elastic member and absorbs water, e.g., sponge, rubber, or resin.

The first bottom wall 16 of the keyboard setting section 11 has a first groove 52 in which the sealing member 51 is placed. The first groove 52 has the shape of a frame corresponding to the sealing member 51 and is formed around the opening 14. The depth of the first groove 52 is half the thickness of the sealing member 51, for example.

Figure 10:
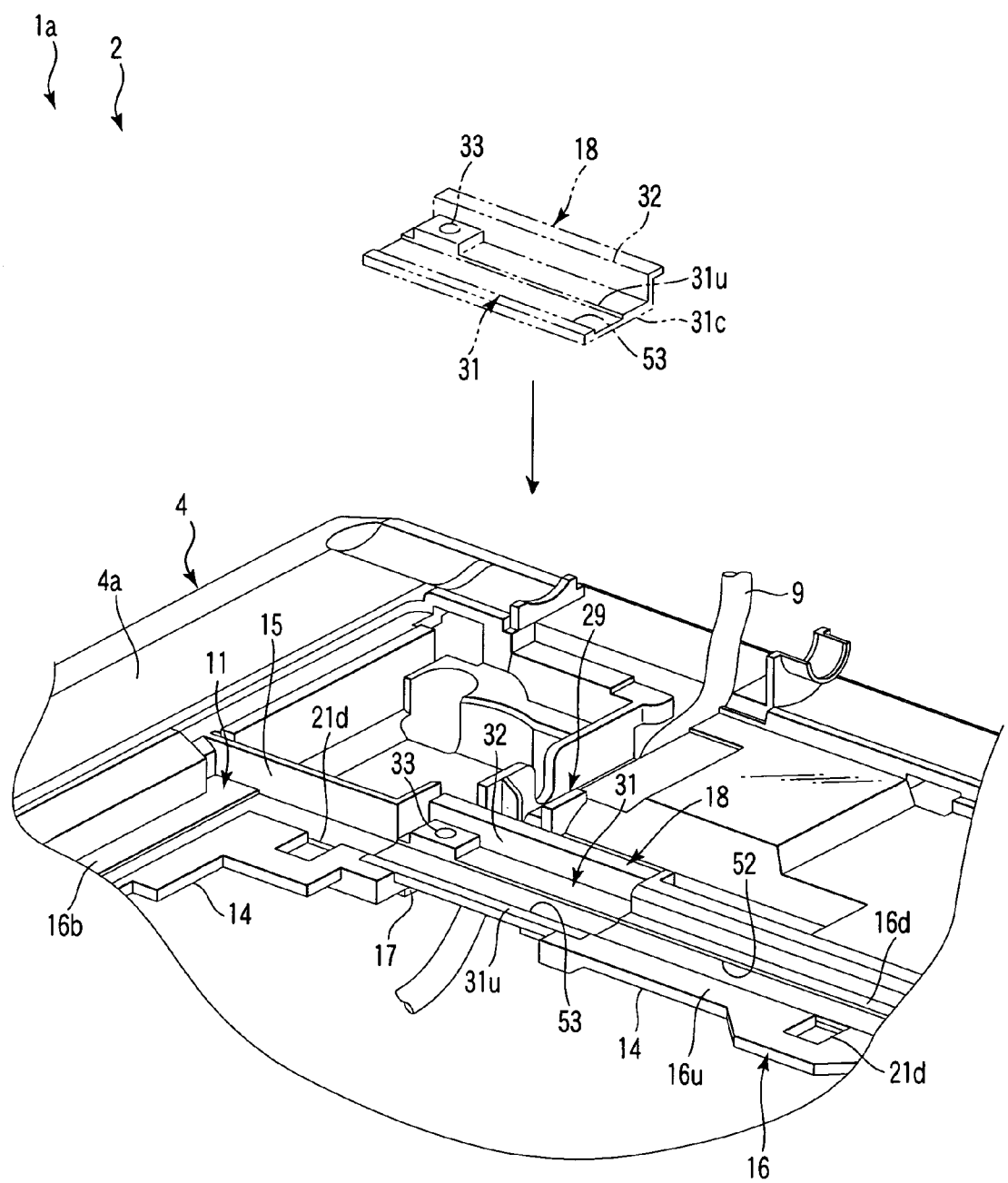
FIG. 10 is an exemplary perspective view showing a cut portion and its surroundings according to the second embodiment.

As shown in FIG. 10, a third bottom wall 31 of a lid 18 has a second groove 53 in which the sealing member 51 is also placed. When the lid 18 is attached to first and second step portions 24*a* and 24*b*, the second groove 53 is continuous with the first groove 52. Thus, the whole circumference of the opening 14 is surrounded by the first and second grooves 52 and 53. The first and second grooves 52 and 53 are equal in depth.

The following is a description of the mechanism of the portable computer 1*a*.

Figure 11:
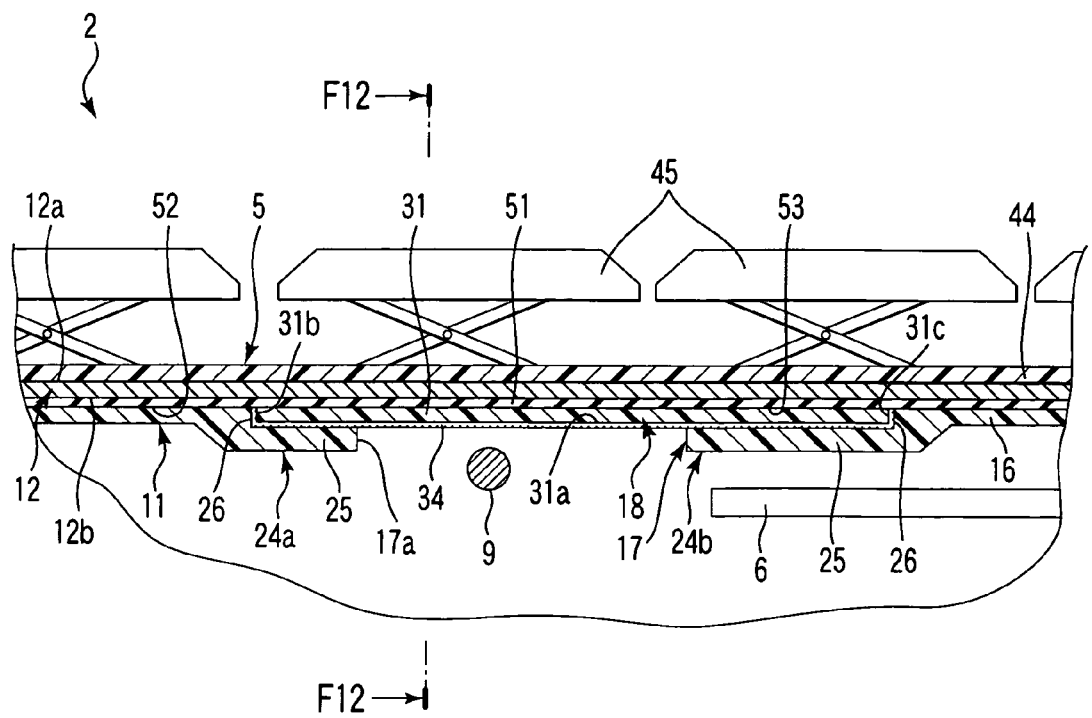
FIG. 11 is an exemplary sectional view of the cut portion and its surroundings according to the second embodiment.
Figure 12:
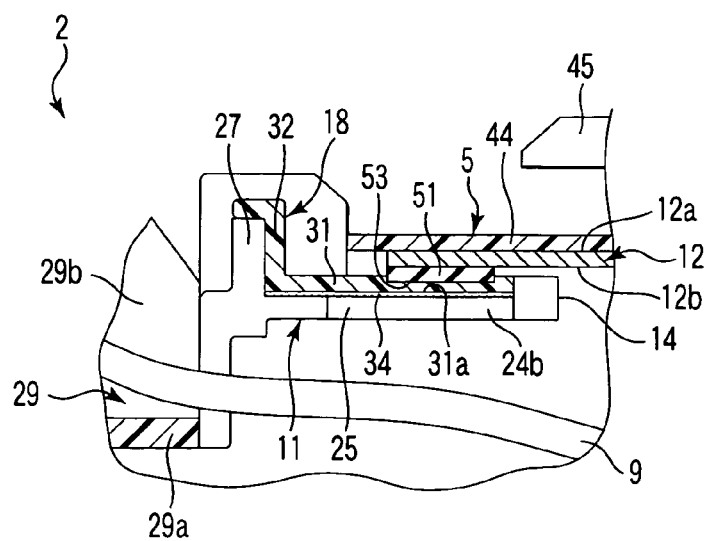
FIG. 12 is an exemplary sectional view of the cut portion and its surroundings taken along line F12-F12 of FIG. 11.

In assembling the portable computer 1*a*, as shown in FIG. 9, the lid 18 is fitted into a cut portion 17, and the sealing member 51 is then placed on the first and second grooves 52 and 53 from above. After the sealing member 51 is placed in this manner, the plate 12 is mounted on the keyboard setting section 11. When first, second, third, and fourth retaining portions 36*a*, 36*b*, 36*c* and 36*d* engage first, second, third, and fourth engaging portions 21*a*, 21*b*, 21*c* and 21*d*, respectively, the sealing member 51 is compressed between the first bottom wall 16 and the plate 12, as shown in FIG. 11. As the sealing member 51 is compressed in this manner, the gap between the first bottom wall 16 and the plate 12 is fully liquid-tight.

According to the portable computer 1a constructed in this manner, the liquid-proof performance of the body 2 can be enhanced. The portable computer 1a of the present embodiment has the cut portion 17 and the lid 18. Thus, it can produce at least the same liquid-proof effect as the portable computer 1 of the first embodiment.

The portable computer 1a of the present embodiment further has the sealing member 51 between the first bottom wall 16 and the plate 12. The gap between the first bottom wall 16 and the plate 12 is made fully liquid-tight by the sealing member 51, so that a liquid spilled on a keyboard 5 can be prevented from entering a housing 4. Thus, the portable computer 1a of the present embodiment can obtain a liquid-proof performance of a higher level.

In the portable computer 1a according to the present embodiment, in particular, the sealing member 51 is supported by the first bottom wall 16 and the third bottom wall 31. Since the respective upper surfaces 16u and 31u of these bottom walls are flush with each other, the sealing member 51 is compressed uniformly. This serves further to enhance the liquid-proof performance of the portable computer 1a.

If the first and second grooves 52 and 53 are provided, in particular, the mounting performance of the sealing member 51 is improved, and the sealing member 51 cannot be shifted when it is compressed. The location of the grooves 52 and 53 in which the sealing member 51 is mounted is not limited to the first bottom wall 16 or the lid 18, but a groove may be formed on a lower surface 12b of the plate 12, for example. The depth of the first and second grooves 52 and 53 is not limited to half the thickness of the sealing member 51. It is suitable that the depth of the grooves 52 and 53 are smaller than the thickness of the sealing member 51.

Although the portable computers 1 and 1a according to the first and second embodiments have been described herein, it is to be understood that the present invention is not limited to these embodiments. One embodiment of the present invention may be also applied to the attachment a cable other than the cable 9 of the display unit 3, e.g., a cable of the keyboard 5. Further, the mounting section to which one embodiment of the invention is applied is not limited to the keyboard setting section 11, but may be a touch-pad setting section, for example. One embodiment of the invention may be applied not only to where the cut portion 17 is provided for the passage of the cable, but also to any other cut portions that are provided according to design or manufacture needs.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing;
a unit supported on the housing; and
a mounting section which is provided on the housing and on which the unit is placed;
a circuit board contained in the housing;
a cable mounting groove provided in a wall of the housing; and
a cable extending through the cable mounting groove from an outside of the housing and electrically connected to the circuit board, wherein:
the mounting section includes (i) an opening, (ii) a peripheral wall, (iii) a support wall projecting horizontally from the peripheral wall and surrounding an entire peripheral edge of the opening, (iv) a cut portion which is provided in the support wall, and (v) a lid which is fitted in the cut portion and is a part of the support wall, the support wall supporting an entire peripheral portion of the unit from below, the entire peripheral portion of the unit being sealed in a liquid-tight manner by the support wall,
the cable mounting groove includes a groove bottom positioned lower than the support wall, and a pair of side walls uprising from the groove bottom, the cable mounting groove communicating with the opening through the cut portion,
the cable mounting groove, the cut portion and the opening are aligned with each other and upwardly open to extend the cable to an inside of the housing before the lid is fitted in the cut portion, and
the lid covers the cut portion and supports part of the peripheral portion of the unit from below to seal the part of the peripheral portion of the unit in the liquid-tight manner.

2. An electronic apparatus of claim 1, wherein the peripheral wall rises from that end part of the support wall which is situated off the opening, the cut portion is made in the support wall and in the peripheral wall, and the lid includes a rising portion which is fitted in the cut portion and is a part of the peripheral wall.

3. An electronic apparatus according of claim 1, wherein the mounting section is a keyboard setting section.

4. An electronic apparatus of claim 2, which further comprises, a plate which covers the opening and is interposed between the unit and the support wall, the support wall including a plurality of engaging portions, the plate including a plurality of retaining portions inserted in the engaging portions of the support wall and hung up on a lower surface of the support wall to thereby fix a peripheral portion of the plate to the support wall.

5. An electronic apparatus of claim 4, which further comprises, a sealing member which is interposed between the plate and the support wall, such that the sealing member is arranged between the engaging portions of the support wall and the peripheral wall.

6. An electronic apparatus of claim 5, wherein the sealing member is in the form of a frame which surrounds the opening, and the engaging portions of the support wall.

7. An electronic apparatus of claim 5, wherein the support wall includes a groove in which the sealing member is placed, the groove extending perpendicular to a direction in which the peripheral wall and the opening are aligned.

8. An electronic apparatus of claim 1, wherein the support wall includes a first surface facing the unit, and the lid includes a second surface facing the unit, the first and second surfaces being flush with each other.

9. An electronic apparatus of claim 1, wherein the mounting section includes a lid supporting portion which supports the lid, the lid supporting portion being provided on the support wall and being lower than an upper surface of the support wall by an amount equal to a thickness of the lid, the lid being bonded to the lid supporting portion.

10. An electronic apparatus comprising:
a housing;
a unit supported on the housing; and a mounting section which is provided on the housing and on which the unit is placed, the mounting section including (i) an opening, (ii) a peripheral wall, (iii) a support wall projecting horizontally from the peripheral wall and surrounding an entire peripheral edge of the opening, (iv), a cut portion which is provided in the support wall, and (v) a lid which is fitted in the cut portion and is a part of the support wall, the support wall supporting an entire peripheral portion of the unit from below, the entire peripheral portion of the unit being sealed in a liquid-tight manner by the support wall.

11. An electronic apparatus of claim 10, which further comprises:
- a circuit board contained in the housing;
- a cable mounting groove provided in a wall of the housing; and
- a cable extending through the cable mounting groove from an outside of the housing and electrically connected to the circuit board, wherein:
  - the cable mounting groove upwardly opens and includes a groove bottom positioned lower than the support wall, and a pair of side walls uprising from the groove bottom,
  - the cut portion includes a groove through which the cable mounting groove communicates with the opening,
  - the cable is guided through the groove to avoid the support wall such that the cable is received in the cable mounting groove and the opening from above,
  - the lid is fitted in the cut portion and covers the groove of the cut portion, and
  - the unit is placed on the support wall and the lid and covers the opening.

12. An electronic apparatus of claim 10, which further comprises a plate which is interposed between the unit and the support wall.

13. An electronic apparatus of claim 12, which further comprises a sealing member which is interposed between the plate and the support wall.

14. An electronic apparatus of claim 13, wherein the mounting section includes an opening which is surrounded by the support wall, and the sealing member is in the form of a frame which surrounds the opening.

15. An electronic apparatus of claim 13, wherein each of the support wall and the lid includes a groove in which the sealing member is placed.

16. An electronic apparatus of claim 10, wherein the support wall includes a first wall portion extending in a longitudinal direction of the housing in front of the opening, a second wall portion extending in a transverse direction of the housing on the left of the opening, a third wall portion extending in the transverse direction of the housing on the right of the opening, and a fourth wall portion extending in the longitudinal direction of the housing behind the opening, the first, second, third and fourth wall portions being connected to each other.

* * * * *